United States Patent
Lindqvist et al.

(10) Patent No.: US 10,725,199 B2
(45) Date of Patent: Jul. 28, 2020

(54) NOISE REDUCTION FOR TOTAL FIELD MAGNETOMETER MEASUREMENTS

(71) Applicant: PGS Geophysical AS, Oslo (NO)

(72) Inventors: Peter Lindqvist, Segeltorp (SE); Robert Juhasz, Stockholm (SE); Johan Mattsson, Trångsund (SE)

(73) Assignee: PGS Geophysical AS, Oslo (NO)

( * ) Notice: Subject to any disclaimer, the term of this patent is extended or adjusted under 35 U.S.C. 154(b) by 88 days.

(21) Appl. No.: 15/919,035

(22) Filed: Mar. 12, 2018

(65) Prior Publication Data

US 2018/0329106 A1 Nov. 15, 2018

Related U.S. Application Data

(60) Provisional application No. 62/504,297, filed on May 10, 2017.

(51) Int. Cl.
*G01V 3/38* (2006.01)
*G01V 3/165* (2006.01)

(52) U.S. Cl.
CPC .............. *G01V 3/38* (2013.01); *G01V 3/165* (2013.01)

(58) Field of Classification Search
CPC .................................. G01V 3/38; G01V 3/165
See application file for complete search history.

(56) References Cited

U.S. PATENT DOCUMENTS

| | | | |
|---|---|---|---|
| 4,617,518 A | 10/1986 | Smka | |
| 4,885,536 A * | 12/1989 | Blanpain | G01V 3/081 324/207.13 |
| 7,191,063 B2 | 3/2007 | Tompkins | |
| 7,319,330 B2 | 1/2008 | Amundsen | |
| 7,362,102 B2 | 4/2008 | Andreis | |
| 7,423,432 B2 | 9/2008 | Amundsen | |
| 7,671,598 B2 | 3/2010 | Ronaess et al. | |
| 7,737,698 B2 | 6/2010 | Tenghamn et al. | |

(Continued)

OTHER PUBLICATIONS

Anderson, et al., "Comparison of a New Marine Magnetometer System to High-Resolution Aeromagnetic Data—A Case Study from Offshore Oman," Reprint of SEG Poster Presentation 1999, 3 total pages.

(Continued)

*Primary Examiner* — Dominic E Hawkins
(74) *Attorney, Agent, or Firm* — Patterson & Sheridan, LLP

(57) ABSTRACT

A method and apparatus for a streamer having a total field magnetometer ("TFM"). A streamer includes a plurality of TFMs in proximity with one another and distributed symmetrically about an axis of the streamer. A streamer includes a first subset of TFMs in a streamer section and in proximity with one another; a second subset in the streamer section and in proximity with one another; wherein the first subset is not in proximity with the second subset. A method includes towing a streamer through a body of water, the streamer comprising first and second TFMs; acquiring magnetic data with the first and the second TFMs; and reducing noise in the data based on at least one of: averaging data from the first and the second TFMs; filtering data from the first and the second TFMs; estimating motion of the first TFM; and estimating rotation of the first TFM.

12 Claims, 8 Drawing Sheets

(56) References Cited

U.S. PATENT DOCUMENTS

| | | | |
|---|---|---|---|
| 8,099,239 B2 | 1/2012 | MacGregor et al. | |
| 8,514,656 B2 | 8/2013 | Juhasz et al. | |
| 8,570,044 B2 | 10/2013 | Tompkins et al. | |
| 8,649,992 B2 | 2/2014 | Ziolkowski et al. | |
| 8,754,649 B2 * | 6/2014 | Sudow | G01V 1/3835 324/334 |
| 8,758,072 B2 | 6/2014 | Voisin et al. | |
| 8,797,036 B2 | 8/2014 | Kennedy et al. | |
| 9,110,195 B2 | 8/2015 | Whan et al. | |
| 9,176,254 B2 * | 11/2015 | Johnstad | G01V 1/201 |
| 9,625,600 B2 | 4/2017 | Juhasz et al. | |
| 2008/0253225 A1 * | 10/2008 | Welker | G01V 1/3835 367/17 |
| 2011/0210743 A1 * | 9/2011 | Tompkins | G01V 3/12 324/338 |
| 2012/0081995 A1 * | 4/2012 | Hillesund | G01V 1/38 367/16 |
| 2012/0134234 A1 * | 5/2012 | Roberts | C08L 89/00 367/19 |
| 2015/0098302 A1 * | 4/2015 | Olivier | G01V 1/38 367/15 |
| 2016/0025887 A1 * | 1/2016 | Rodney | E21B 47/02 324/339 |
| 2016/0103239 A1 | 4/2016 | Juhasz et al. | |
| 2016/0195626 A1 | 7/2016 | Rinnan et al. | |
| 2016/0201447 A1 * | 7/2016 | Hoversten | E21B 47/122 324/324 |

OTHER PUBLICATIONS

Frowe, et al., "A Total Field Magnetometer for Mobile Operation," Presented at the Annual Meeting of the Society, Mar. 1947, Los Angelas, California and at the Regional Meeting, Jun. 6, 1947, Pittsburgh. Manuscript received by the Editor Jan. 7, 1948, Accessed Online on May 22, 2017, 6 total pages.

Geometrics G-882 Cesium Marine Magnetometer Operation Manual, 25919-OM REV. D, Copyright 2005, 123 total pages.

Geometrics MFAM Magnetometer Brochure, Copyright 2012, Accessed Online http://mfam.geometrics.com/index.html on Oct. 12, 2017, 1 total page.

Hrvoic, Doug, "High Resolution Magnetics in Marine Exploration," Reprinted from Hydro International 1999, 3 total pages.

Neska, et al., "Reducing motion noise in marine magnetotelluric measurements by means of tilt records," Geophys. J. Int., vol. 194, Pub. 2013, pp. 304-315, Accessed Online https://academic.oup.com/gji.article-abstract/194/1/304/644388/Reducing-motion-noise-in-marine-magnetotelluric on Sep. 28, 2017, 12 total pages.

Prouty, et al., "Applications of Micro-fabricated Atomic Magnetometers," SAGEEP, 2015, pp. 469-472, Accessed Online on Oct. 12, 2017, 4 total pages.

Seaspy Marine Magnetometer Brochure, Marine Magnetics, Accessed Online www.marinemagnetics.com, 4 total pages.

Seaspy Overhauser Magnetometer Technical Application Guide, SeaSPY Technical Application Guide rev1.4, Copyright 2007, pp. 1-13, 13 total pages.

* cited by examiner

NOISE REDUCTION FOR TOTAL FIELD MAGNETOMETER MEASUREMENTS

CROSS REFERENCE TO RELATED APPLICATIONS

This application claims benefit of U.S. Provisional Patent Application Ser. No. 62/504,297, filed May 10, 2017, entitled "Total Field Magnetometer Streamer Mounting Configuration," which is incorporated herein by reference.

BACKGROUND

This disclosure is related generally to the field of marine surveying. Marine surveying may include, for example, seismic and/or electromagnetic surveying, among others. For example, this disclosure may have applications in marine surveying in which one or more geophysical sources are used to generate energy (e.g., wavefields, pulses, signals), and geophysical sensors—either towed or ocean bottom—receive energy generated by the geophysical sources and possibly affected by interaction with subsurface formations. Geophysical sensors may be towed on sensor cables (referred to as streamers). Some marine surveys locate geophysical sensors on ocean bottom cables or nodes in addition to, or instead of, streamers. The geophysical sensors thereby collect geophysical survey data (or simply "survey data") which may be useful in the discovery and/or extraction of hydrocarbons from subsurface formations.

In marine surveying, a streamer is typically a cable assembly that can be stored on a drum on the towing vessel. The streamers are typically made of multiple components, such as electrical conductors, fiber optics, and stress-supporting members, all bundled together and covered with a protective outer skin. The streamer may be up to several kilometers in length. In general, the streamer has little stiffness in directions other than inline, so it can move easily both laterally and in torsion/rotation when deployed in the water. When sensors such as velocity, position, acceleration, and/or electromagnetic sensors are incorporated into the streamer, the streamer motion, rotation, and/or movement through a background magnetic field may be sensed directly by the sensors. This may produce a level of noise which may degrade the data acquired during the marine survey. For example, the noise may be measurements of local conditions in the surrounding water (e.g., currents) rather than geophysical signals from the subsurface formation.

Electromagnetic surveying may include measurements of electric fields, magnetic fields, or a combination of the two. Such measurements may measure specific components of the field(s), such as in-line or cross-line, or measurements may obtain data indicative of the absolute value or vector direction of the total field(s). For example, magnetometers for use in electromagnetic surveying may be divided into two principal classes:

Vector magnetometers that are sensitive in a certain direction. These may be grouped to provide simultaneous measurements in two or three orthogonal directions.

Total field magnetometers that are sensitive to the total field, but do not map the magnetic field vectors.

Vector magnetometers may provide directional information, but may not accurately map the total magnetic field while moving—motion noise may be translated into magnetic field noise. This reduces the benefits of using conventional vector magnetometers in a towed electromagnetic sensor cable.

Total field magnetometers ("TFMs") may monitor changes of the total magnetic field at positions on a moving platform. TFMs may be subject to less motion noise than vector magnetometers. TFMs have been used in airborne applications. However, conventional TFMs are large (e.g., a sensor head larger than 100 $cm^3$), expensive, and excessively power consuming (e.g., greater than 20 Watts). One example marine magnetometer shown in FIG. 1 weighs between 40 lb and 50 lb, and is between 4 ft and 5 ft in length. Moreover, conventional cesium magnetometers may have a "blind spot" around the poles of the sensor head resulting in reduced sensitivity to fields in the direction of the poles.

In some electromagnetic surveys, the background magnetic field is assumed to not vary or to smoothly vary across the streamer spread. For example, the Earth's magnetic field may be modeled as varying linearly with distance across the streamer spread. Survey data may then be adjusted by (1) measuring the background magnetic field at several points, (2) modeling the background magnetic field across the entire streamer spread, and (3) subtracting the modeled background magnetic field from the acquired electromagnetic data. However, the linear assumption may fail for electromagnetic surveys near the Earth's poles.

Total magnetic field measurements on geophysical streamers would benefit from new equipment and/or methods that provide better motion noise reduction or mitigation. Survey data quality would benefit from better measurements of the background magnetic field.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

DETAILED DESCRIPTION

Figure 1:
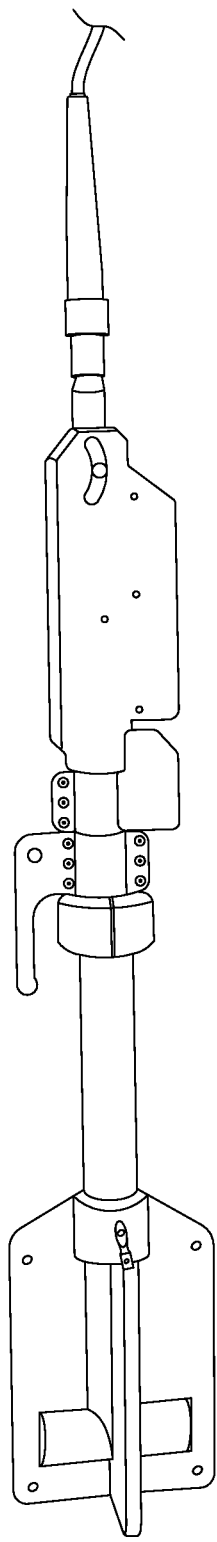
FIG. 1 illustrates a commercial marine total field magnetometer.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise.

Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of variables such as wind, waves, currents, or other unplanned phenomena. "Nominal" may be implied as commonly used in the field of marine surveying.

"Axial" and/or "longitudinal" shall mean the direction along the length of a cable.

"Lateral" shall mean a direction perpendicular to the axial direction.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Forward" or "front" shall mean the direction or end of an object or system that corresponds to the intended primary direction of travel of the object or system.

"Aft" or "back" shall mean the direction or end of an object or system that corresponds to the reverse of the intended primary direction of travel of the object or system.

"Port" and "starboard" shall mean the left and right, respectively, direction or end of an object or system when facing in the intended primary direction of travel of the object or system.

"Obtaining" data shall mean any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

The term "near-real time" refers to the time delay resulting from detecting, sensing, collecting, filtering, amplifying, modulating, processing, and/or transmitting relevant data or attributes from one point (e.g., an event detection/sensing location) to another (e.g., a data monitoring location). In some situations, a time delay from detection of a physical event to observance of the data representing the physical event is insignificant or imperceptible, such that near-real time approximates real time. Near-real time also refers to longer time delays that are still short enough to allow timely use of the data to monitor, control, adjust, or otherwise impact subsequent detections of such physical events.

If there is any conflict in the usages of a word or term in this specification and one or more patent or other documents that may be incorporated herein by reference, the definitions that are consistent with this specification should be adopted for the purposes of understanding this disclosure.

The present disclosure generally relates to marine survey methods and apparatuses, and, at least in some embodiments, to novel magnetometer noise reduction systems, and their associated methods of use. Embodiments of the present disclosure can thereby be useful in the discovery and/or extraction of hydrocarbons from subsurface formations.

Figure 2:
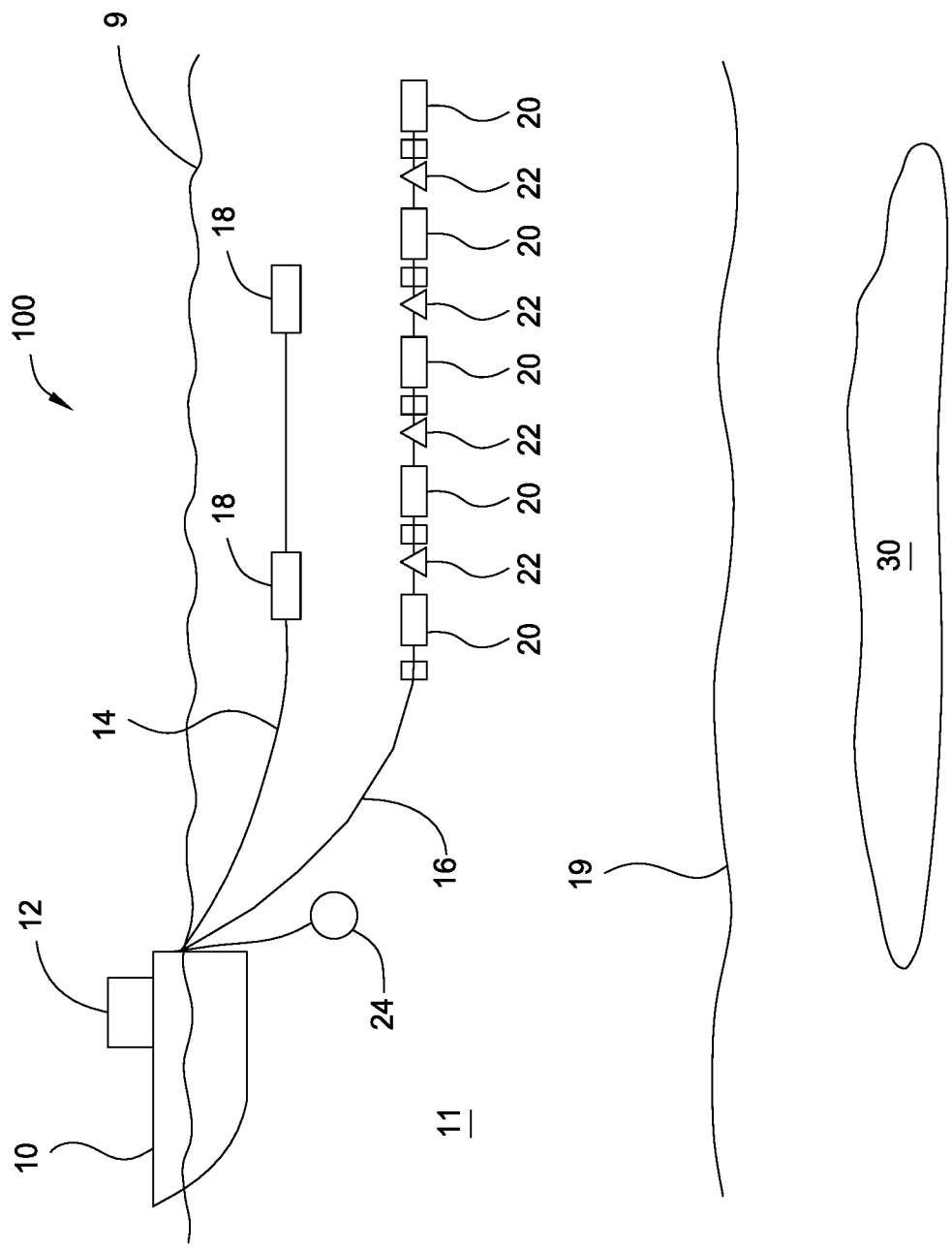
FIG. 2 illustrates a marine surveying system which may be used for geophysical surveying.

FIG. 2 generally illustrates a marine surveying system 100 which may be used for geophysical surveying. As shown, a vessel 10 may move along the surface 9 of a body of water 11, such as a sea, river, lake, or ocean. The vessel 10 may include equipment which may be referred to as a recording system 12. The recording system 12 may include devices for actuating geophysical sources, such as source electrodes 18 and/or other devices disposed on or along a source cable 14 towed by the vessel 10. The recording system 12 may also include navigation equipment for navigating the vessel 10, positioning equipment for determining the geodetic position of the vessel 10 and/or components towed by the vessel 10 in the body of water 11, and a recording device for recording data representing physical phenomena detected by one or more geophysical sensors (e.g., electromagnetic or seismic) on one or more streamers, such as sensor cable 16. As shown, the sensor cable 16 may also be towed by the vessel 10. Alternatively, the one or more streamers may be towed by another vessel (not shown), or the geophysical sensors may be configured on ocean bottom cables or nodes. In some embodiments, geophysical sensors may be disposed on one or more of a sensor cable 16 towed by vessel 10, a sensor cable towed by another vessel, ocean bottom cables, and ocean bottom nodes. In some embodiments, sensor cable 16 may be coupled to vessel 10 with towing equipment, including lead-in lines, spreader cables, paravanes, harnesses, etc.

The source cable 14 in the present example may include an antenna consisting of multiple (two are shown in the illustrated example) source electrodes 18 disposed at spaced apart positions along the source cable 14. At selected times, certain components of the equipment in the recording system 12 may conduct electric current across the source electrodes 18. The time varying component of such electric current may produce an electromagnetic field that propagates through the body of water 11 and into the subsurface formations below the water bottom 19. The subsurface formations below the water bottom 19 may include, for example, a resistive anomaly region 30 whose characteristics may be the target of the electromagnetic surveying.

The arrangement of the source electrodes 18 shown in FIG. 2, referred to as an in-line horizontal electric dipole antenna, is not the only type of electromagnetic antenna that may be used with embodiments of the disclosure. The source cable 14 may also include, in addition to, or in substitution of, the in-line horizontal electric dipole antenna shown in the figure, any one or more of a cross-line electric dipole antenna, a vertical electric dipole antenna, and horizontal or vertical magnetic dipole antenna (current loop), or similar devices with other orientations with respect to the towing direction.

In the illustrated example, the vessel 10 may also tow at least one sensor cable 16. The sensor cable 16 may include a plurality of electromagnetic sensors 20 at spaced apart positions along the sensor cable 16. Each of the electromagnetic sensors 20 may measure a parameter related to the electromagnetic field resulting from interaction of the electromagnetic field imparted by the source electrodes 18 into the subsurface formations below the water bottom 19. The electromagnetic sensors may be, for example, pairs of receiver electrodes disposed at spaced apart positions along the sensor cable 16, magnetometers (e.g., single axis or multi-axis vector magnetometers), or groupings of electrode pairs and/or magnetometers.

The sensor cable 16 in some embodiments may also include seismic sensors, such as hydrophones and/or geophones, shown generally at 22, disposed at spaced apart locations along the sensor cable 16. In some embodiments, seismic energy sensors 22 may be disposed on one or more of sensor cable 16 towed by vessel 10, a sensor cable towed by another vessel, ocean bottom cables, and ocean bottom nodes. For such examples wherein the marine surveying system 100 includes seismic sensors, the vessel 10 or another vessel may tow a seismic energy source 24, such as an air gun, marine vibrator, or array of air guns or marine vibrators. The seismic energy source 24 may be actuated at selected times by certain equipment in the recording system 12, and signals detected by the seismic sensors 22 may be recorded by a signal recording device in the recording system 12. During electromagnetic survey operations, seismic signals may be acquired substantially contemporaneously with electromagnetic signals detected by the electromagnetic sensor 20, and/or may be acquired at other times.

It should be understood that the example in FIG. 2, including only one sensor cable 16, is shown to illustrate how to make and use a sensor cable according to various aspects of disclosed embodiments. Such a sensor cable may be used in acquisition systems that include a plurality of laterally spaced apart sensor cables towed by the vessel 10, and/or by another vessel, in a selected configuration to provide "in-line" and "cross-line" electromagnetic and/or seismic signals.

During an electromagnetic survey, vessel 10 tows sensor cable 16 through the body of water 11. Water currents may cause various portions of sensor cable 16 to move laterally and/or vertically at times during the electromagnetic survey. Electromagnetic sensors 20 on the various portions of sensor cable 16 thereby move non-uniformly through the Earth's magnetic field. Movements of a magnetometer through the strong magnetic field of the Earth causes motion-induced noise ("motion noise") in data acquired by electromagnetic sensors. Consequently, electromagnetic survey data may be distorted by such motion noise. Vector magnetometers may be more susceptible to such motion noise. Typically, the vector magnetometer components of a 3-axis magnetometer will not be in perfect orthogonal orientation. Simply adding the signals from the vector magnetometers will, thus, not reproduce the total field, even when only one of the components is aligned with the Earth's magnetic field.

Likewise, as vessel 10 tows sensor cable 16 through the body of water 11, portions of sensor cable 16 may twist, for example, about the axis of sensor cable 16. Electromagnetic sensors 20 on the various portions of sensor cable 16 may thereby change orientation relative to the Earth's magnetic field. Changing orientation of a magnetometer relative to the magnetic field of the Earth causes twist noise. For example, a vector magnetometer may be susceptible to twist noise as the axis of the vector magnetometer changes orientation relative to the magnetic field of the Earth. As another example, a TFM may be susceptible to twist noise as the blind spot axis of the magnetometer changes orientation relative to the magnetic field of the Earth. Consequently, electromagnetic survey data may be distorted by such twist noise.

Another source of noise comes from electromagnetic field interference ("EMI"). Electrical current in power and/or signal wires in a streamer may create EMI for components near the wires. The current may be generated by survey equipment, or the current may be induced by motion of the wires through magnetic fields, such as the background magnetic field or an electromagnetic field produced by an electromagnetic survey source. EMI may cause noise in data acquired by electromagnetic sensors. In some embodiments further discussed below, mounting a magnetometer away from wires in a streamer may reduce the EMI noise in data acquired by the magnetometer. For example, a magnetometer may be mounted at the aft end of a streamer, where there may be fewer power and/or signal wires. As another example, a magnetometer may be mounted externally on a streamer, at large distance from the axis of the streamer.

At least one embodiment of the present disclosure includes using TFMs included in a towed streamer electromagnetic system (e.g., a CSEM system) to acquire magnetic field data along a survey line jointly with electric field sensors. For example, U.S. Pat. No. 8,649,992 filed by Ziolkowski et al. describes techniques for using motion-induced voltages in magnetometers to correct detected electromagnetic signals from subsurface formations for the effects of such motion-induced voltages in electromagnetic sensors. As another example, including the magnetic field together with the standard electric field in 2D and 3D towed streamer electromagnetic inversion may reduce non-uniqueness and ambiguity in a resulting subsurface resistivity model. In at least one embodiment, the application of TFMs in CSEM surveying may include induced magnetic fields in the range of 10-10,000 picoteslas (pT) that can be resolved with a resolution of about 1 percent. A high sensitivity in the magnetic field data with respect to changes in the subsurface can be obtained for low frequencies and longer offsets with field levels around 1,000 pT. A cesium TFM may have a noise floor of 5 pT/Hz$^{1/2}$. In at least one embodiment, a 100 second integration time may correspond to a noise level of 0.5 pT. In such an example, fields as weak as 50 pT may be accessible for use in CSEM surveying from one TFM. As would be understood by one of ordinary skill in the art with the benefit of this disclosure, measurements of total magnetic field at a number of offsets along the streamer may be fed into an inversion routine together with survey data (e.g., electric field data). Typically, data inversion routines will be done subsequent to data acquisition (i.e., not in real time).

In some embodiments, the TFMs may include micro-fabricated atomic magnetometers ("MFAMs"). Exemplary MFAMs are available from Geometrics, Inc., of San Jose, Calif. In contrast to other approaches that use vector magnetometers, at least one embodiment of the present disclosure can take advantage of motion insensitivity of TFMs to allow magnetic field data to be acquired with sufficiently low motion noise to be used in inversion of sub-surface resistivity structures. For example, electromagnetic survey data may be jointly inverted with total magnetic field data from TFMs as disclosed herein. At least one embodiment may include a magnetometer towing/mounting scheme for field measurements, and/or towing/mounting of a plurality of sensors to obtain further reduction of noise in the measured magnetic field. At least one embodiment may advantageously utilize the small—in size, weight, and/or power requirement—dimensions of MFAMs in novel mounting and/or towing configurations.

At least one embodiment disclosed herein provides reduced noise in magnetic field measurements during a geophysical survey. For example, noise reduction may be achieved with simple averaging of several (e.g. N) uncorrelated TFMs to achieve noise reduction (e.g., square root of N improvement). As another example, "blind spot" effects may be mitigated. In this scenario, several collocated sensors may be suspected to have influence from the blind spot. A threshold value may be selected, and total magnetic field measurements from the collocated sensors may be filtered to remove those measurements with values below the threshold. Thus only those measurements not influenced by the blind spot will be retained. Optionally, after this filtering is done, further averaging may be done. This type of processing may be done on-board the survey vessel and/or in near-real time.

Figure 3:
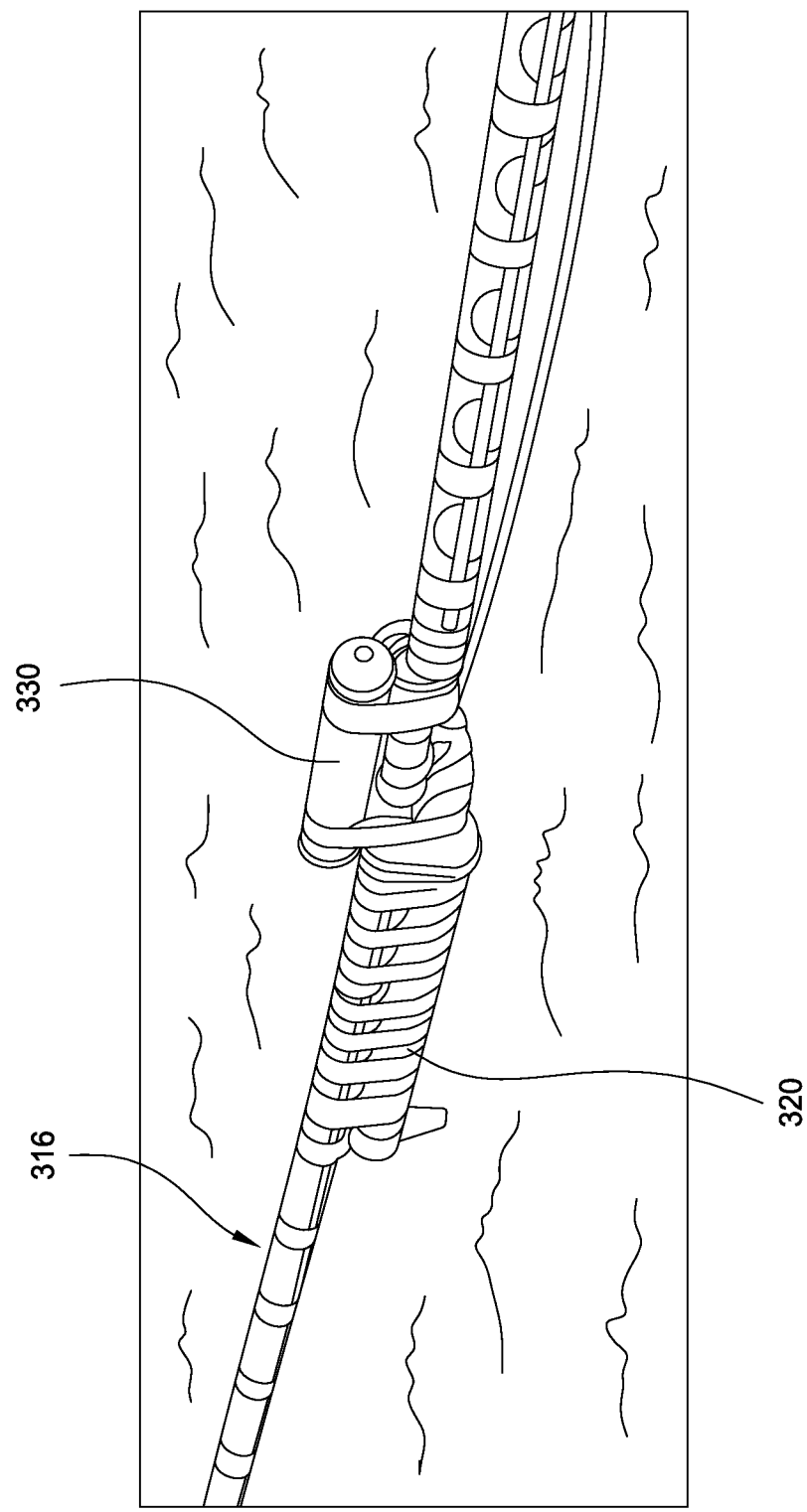
FIG. 3 illustrates a towing/mounting configuration for one or more total field magnetometers.

In embodiments, a TFM may be towed behind a vessel (e.g., vessel 10 in FIG. 2) in a plurality of different towing/mounting configurations. For example, a TFM may be towed freely in its own cable, mounted to towing equipment (e.g., a lead-in line) for a streamer, and/or mounted on the streamer. FIG. 3 illustrates a possible towing/mounting configuration for a TFM 320. As illustrated, the TFM 320 is strapped to a streamer 316. For example, streamer 316 may be an electromagnetic sensor streamer as disclosed in U.S. Pat. No. 8,514,656 to Juhasz et al. FIG. 3 also illustrates a possible towing/mounting configuration for an inertial measurement unit ("IMU") 330. In some embodiments, a section of streamer 316 may be configured to be integrated with a TFM, such as with attachment loops or sleeves. In some embodiments, a TFM may be attached to a streamer 316 with straps, tape, rope, cloth, fibrous materials, leather, rubber materials, plastic materials, etc., or any combination thereof. The mounting of magnetometer 320 to streamer 316 may be sufficiently secure to withstand forces associated with being towed through the water. In some embodiments, the mounting may be designed to operationally disconnect and reconnect, in order to service components, for example.

In at least one embodiment, a TFM may be included in a towed electromagnetic survey system. For example, the electromagnetic source and sensors (electrodes and magnetometers) may be aligned in-line. This creates magnetic fields primarily in the cross-line direction. In some embodiments, cesium magnetometers may be mounted with a blind spot axis in the streamer direction. The cross-line component of the electromagnetic field may then be measured independently of the streamer rotation. In some embodiments, mounting a plurality of cesium TFMs within a small distance may reduce noise.

Figure 4:
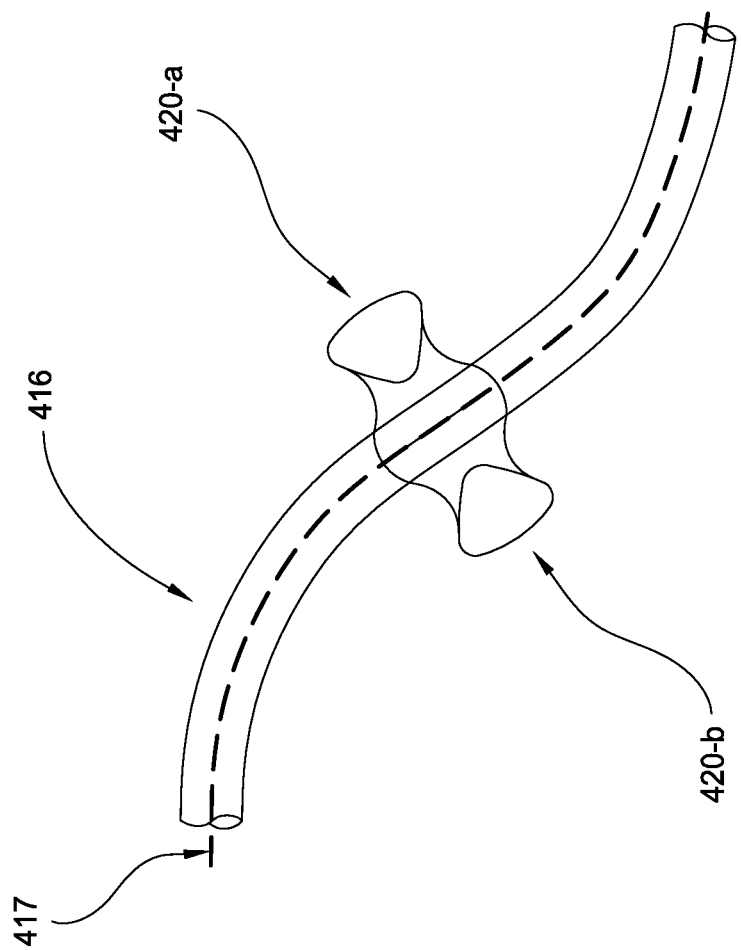
FIG. 4 illustrates another towing/mounting configuration for one or more total field magnetometers.

FIG. 4 illustrates a pair of TFMs 420 mounted externally to streamer 416. The TFMs 420 may be rigidly mounted so that a fixed distance is maintained between TFM 420-a and TFM 420-b. In the illustrated embodiment, the TFMs 420 are essentially 180° apart from one another, as measured about the axis 417 of the streamer 416. Other embodiments may be envisioned where three TFMs are rigidly mounted essentially 120° apart from one another, as measured about the axis 417 of the streamer 416. Still other embodiments may be envisioned with a variety of other numbers of TFMs 420 rigidly mounted at various angles about the axis 417 of the streamer 416. In some embodiments, the TFMs 420 are symmetrically mounted about the axis 417 of streamer 416 (i.e., same angle of separation and same distance from axis), while in other embodiments the TFMs 420 are unsymmetrically mounted (i.e., different angle of separation and/or different distance from axis). In some embodiments, data from TFM 420-a may be averaged with data from TFM 420-b to approximate a measurement proximate (e.g., at or near, for example, no farther away than 20% of the radius of the streamer) the axis 417 of the streamer 416. (As used herein, "average" refers to a calculation of central tendency, including calculations such as arithmetic mean, geometric mean, median, mode, weighted average, etc.) In some embodiments, data from TFM 420-a may be used with data from TFM 420-b to estimate a magnetic field gradient proximate the axis 417 of the streamer 416. Maintaining a larger separation distance between each TFM 420 and the streamer 416 may reduce noise, for example EMI noise. However, as would be understood by a person of ordinary skill in the art, mounting a TFM 420 at an increased distance between the TFM 420 and the axis 417 of the streamer 416 may result in a greater drag force and/or greater leverage (torque) during towing. In some embodiments, a magnetometer data system may average data from TFM 420-a and TFM 420-b to approximate a total magnetic field measurement proximate the axis 417 of the streamer 416. In some embodiments, a magnetometer data system may utilize data from TFM 420-a and TFM 420-b to estimate a magnetic field gradient proximate the axis 417 of the streamer 416. In some embodiments, the TFMs 420 may be MFAMs. The small dimensions of MFAMs may mitigate the effects of drag force and/or leverage when the TFMs 420 are mounted at a distance from the axis 417 of the streamer 416.

Figure 5:
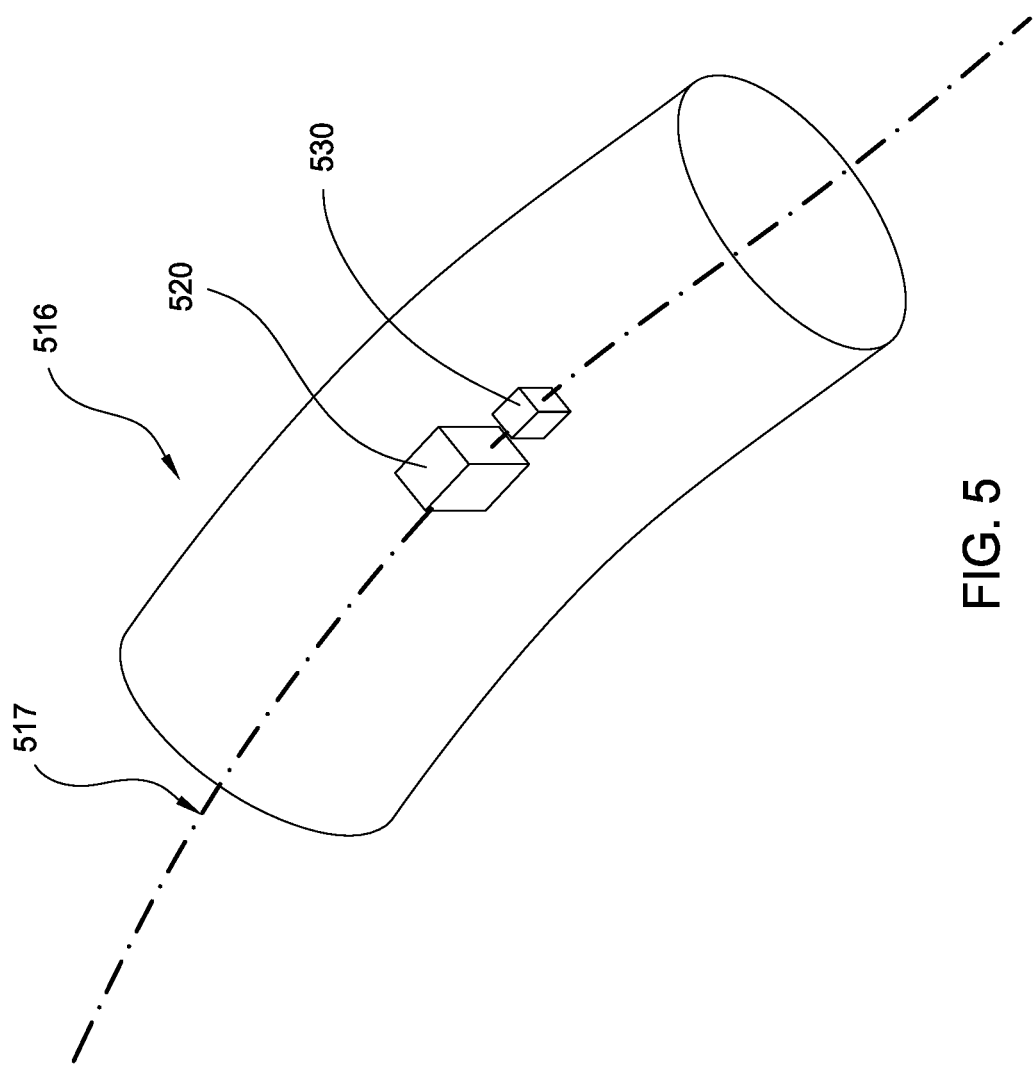
FIG. 5 illustrates another towing/mounting configuration for one or more total field magnetometers.

In some embodiments, one or more TFMs may be mounted internally to the streamer. FIG. 5 illustrates a streamer 516 having a TFM 520 mounted internally. In some embodiments, the TFMs 520 may be MFAMs. For example, the small dimensions of MFAMs may be beneficial for mounting TFMs 520 internally to a streamer 516. As illustrated, the TFM 520 is disposed proximate the axis 517 of the streamer 516. As would be understood by one of ordinary skill in the art, axial mounting, and/or axially-symmetrical mounting, may beneficially balance the streamer 516 as it is towed through the water. However, non-axial mounting and non-axially-symmetrical mounting are also possible.

In some embodiments, one or more IMUs 530 may be mounted near to the TFM 520. In other words, the IMU 530 may be collocated with the TFM 520. As used herein, "collocated" refers to a spatial (lateral and longitudinal) separation that is sufficiently small to allow the data acquired by each sensor to be interpreted as being at the same point or in the same data bin. In some embodiments, the spatial separation may be no more than 50 cm. TFM 520 and IMU 530 may be mounted so as to be in fixed spatial and rotational relationship with one another. As illustrated, the IMU 530 is disposed proximate the axis 517 of the streamer 516. In some embodiments, IMU 530 may include one or more vector magnetometers, gyroscopes, and/or accelerometers. For example, IMU 530 may have nine degrees of freedom, having a three-axis vector magnetometer, a three-axis gyroscope, and a three-axis accelerometer. IMU 530 may include, for example, one or more motion-responsive sensors as disclosed in U.S. Pat. No. 8,514,656 to Juhasz et al. In some embodiments, IMU 530 may include one or more MFAMs Measurements from IMU 530 may be used to compensate for motion noise and/or twist noise in the data acquired by TFM 520. In some embodiments, measurements from IMU 530 may be used to estimate the motion and/or rotation experienced by TFM 520 (e.g., during a survey), and the estimated motion and/or rotation may be used to estimate the motion noise experienced by TFM 520. Data acquired by TFM 520 may then be adjusted to remove the estimated motion noise. In some embodiments, measurements from IMU 530 may be utilized to calibrate TFM 520. For example, data may be acquired with TFM 520 and IMU 530 during towing of streamer 516 along a survey path without actuation of the geophysical source (e.g., prior-to or following survey data acquisition). The background magnetic field and/or effects of motion on measurements of the background magnetic field may then be estimated. Such calibration information may be used to reduce noise in survey data (i.e., data acquired during towing along the survey path with actuation of the geophysical source).

It should be understood that a magnetometer may have an orientation as defined by the poles of the sensor. As previously discussed, some magnetometers may have blind spots at or near the poles. Measurements from IMU 530 may be used to compensate for twist noise in the data acquired by TFM 520. In some embodiments, measurements from IMU 530 may be used to estimate the rotation experienced by TFM 520 (e.g., during a survey), and the estimated rotation may be used to estimate the twist noise experienced by TFM 520.

In some embodiments, one or more externally-mounted TFMs (e.g., TFM 420 in FIG. 4) may be utilized in conjunction with one or more internally-mounted TFMs (e.g., TFM 520 in FIG. 5). For example, data from an externally-mounted TFM 420 may be averaged with data from an internally-mounted TFM 520 that is in longitudinal proximity therewith to approximate a noise-reduced total magnetic field measurement. As used herein, "longitudinal proximity" refers to a longitudinal separation that is sufficiently small to allow the data acquired by each sensor to be interpreted as being at the same point or in the same data bin. For example, the longitudinal separation may be small in comparison to offset (i.e., the distance between the source and the receiver). As another example, the longitudinal separation may be no more than 5% of the offset. In some embodiments, the longitudinal separation may be no more than 20 m. In some embodiments, a magnetic gradient may be estimated based on data from an externally-mounted TFM 420 and data from an internally-mounted TFM 520. In some embodiments, a magnetometer data system may average data from externally-mounted TFM 420 and internally-mounted TFM 520 to approximate a noise-reduced total magnetic field measurement. In some embodiments, a magnetometer data system may utilize data from the externally-mounted TFM 420 and the internally-mounted TFM 520 to estimate a magnetic field gradient.

Figure 6:
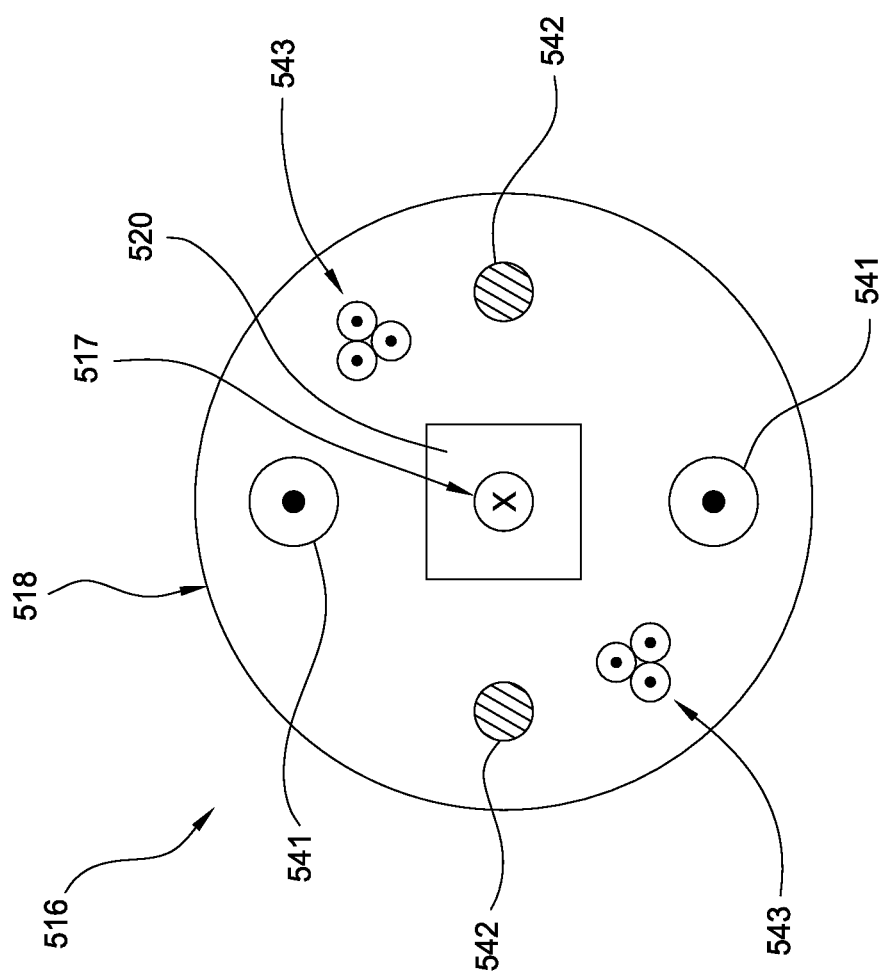
FIG. 6 illustrates another towing/mounting configuration for one or more total field magnetometers.

FIG. 6 illustrates a TFM 520 that is mounted internally in streamer 516. For example, TFM 520 may be disposed proximate the axis 517 of the streamer 516. Additional streamer components are illustrated, including two coaxial power lines 541, two strength members 542, and two sets of coaxial signal lines 543. In some embodiments, the components may be separated, and/or held in their respective dispositions, by a filler material. In some embodiments, the streamer 516 may be manufactured with an extrusion processes that places and retains the components in their respective dispositions within the streamer and/or any interstitial filler material. As illustrated, the TFM 520 and the additional streamer components are disposed in streamer 516 axially symmetrically. For example, the two coaxial power lines 541 are located on opposite sides of streamer 516, equally-distant from axis 517. The weight of the additional streamer components may then be distributed axially-symmetrically, thereby passively reducing EMI noise.

In some embodiments, the TFM 520 may be a MFAM. The small dimensions of the MFAM may more easily achieve symmetrical weight distribution. For example, the weight of a MFAM located proximate the axis 517 of streamer 516 may be negligible in comparison to the weight of additional streamer components in longitudinal proximity therewith.

In some embodiments, the power and/or signals carried along each of the additional streamer components may be matched and/or balanced to counter-act EMI noise. In some embodiments, TFM 520 may be located away from axis 517. The streamer components, such as coaxial power lines 541, strength members 542, and coaxial signal lines 543, may be symmetrically disposed with respect to TFM 520, while being either symmetrically or unsymmetrically disposed with respect to axis 517. Such configuration may reduce EMI noise in data collected by TFM 520 in comparison to configurations wherein the streamer components are unsymmetrically disposed with respect to TFM 520.

In some embodiments, one or more externally-mounted TFMs (e.g., TFM 420 in FIG. 4) may be utilized in conjunction with one or more symmetrically-internally-mounted TFMs (e.g., TFM 520 in FIG. 6). For example, externally-mounted TFMs 420 may be mounted axially-symmetrically on streamer 516, and internally-mounted TFMs 520 may be mounted axially-symmetrically within streamer 516.

In some embodiments, one or more IMUs 530 (e.g., IMUs 530 in FIG. 5) may be mounted axially-symmetrically within streamer 516, and may be collocated with TFMs 520 (e.g., TFM 520 in FIG. 6).

In some embodiments, at other longitudinal locations along the streamer 516 (e.g., longitudinal locations other than illustrated in FIG. 6), a conductor cable (including one or more electrical wires and/or optical fibers) may be disposed proximate the axis 517. In embodiments wherein internally-mounted TFM 520 is disposed proximate the axis 517 of the streamer 516, TFM 520 may include pass-thru couplings for the conductor cable. In some embodiments, the conductor cable may conformally wrap around TFM 520. In some embodiments, TFM 520 may be disposed slightly off of axis 517 so that the conductor cable may follow near or along the axis 517.

In some embodiments, the TFM 520 may be disposed in streamer 516 far away from the additional streamer components. For example, if TFM 520 is proximate axis 517, the additional streamer components may be disposed at or near the outer surface 518 of streamer 516. In embodiments wherein streamer 516 has a jacket, the additional streamer components may be disposed immediately inside the jacket, immediately outside the jacket, or a combination thereof. By disposing TFM 520 far away from the additional streamer components, EMI noise may be reduced.

In some embodiments, a plurality of TFMs 520 may be disposed in longitudinal proximity in streamer 516. The configuration of the plurality of TFMs 520 and additional streamer components may be selected so that the TFMs 520 are disposed far away from the additional streamer components to reduce EMI.

Figure 7:
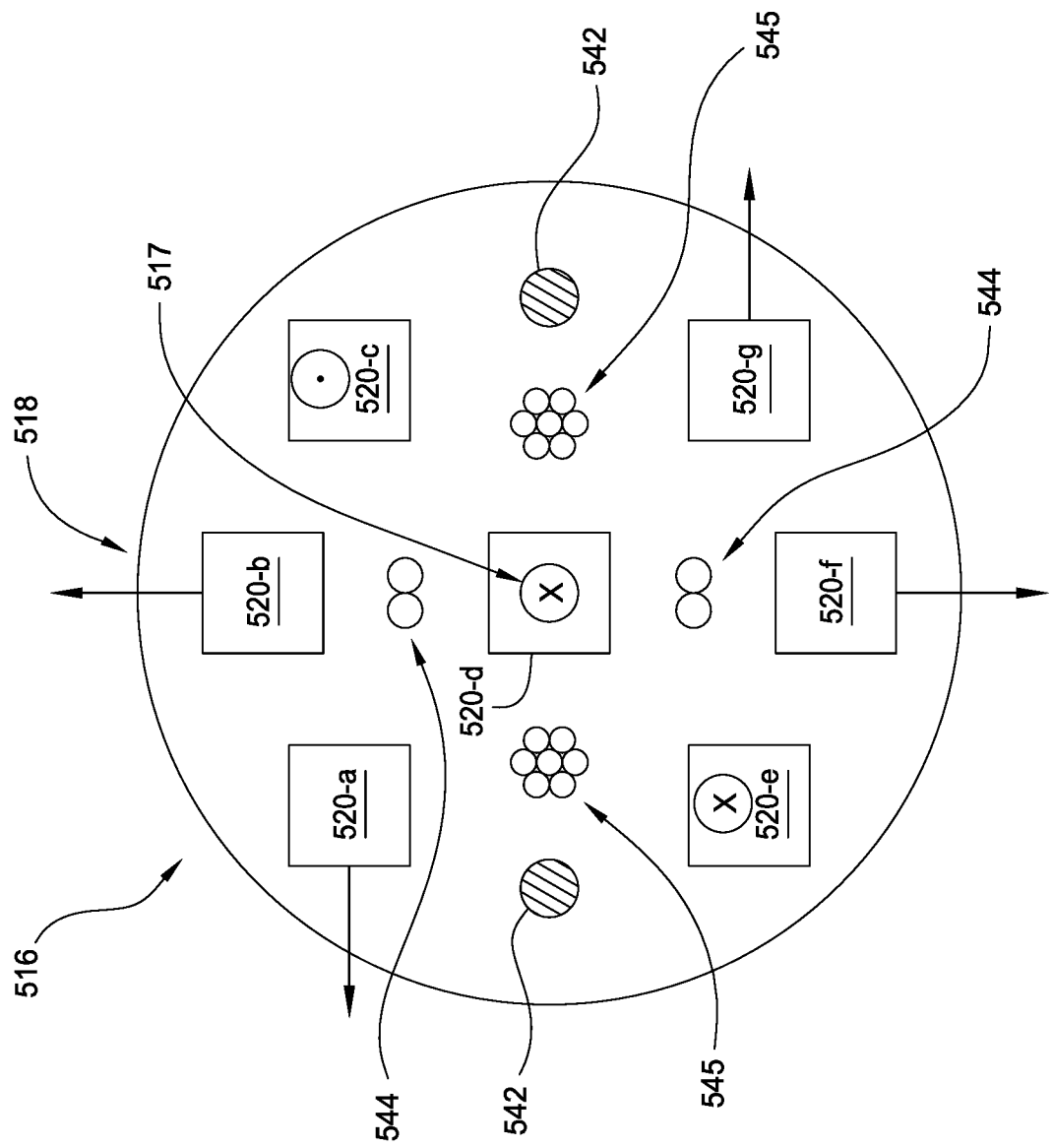
FIG. 7 illustrates another towing/mounting configuration for one or more total field magnetometers.

FIG. 7 illustrates a plurality of internally-mounted TFMs 520 in longitudinal proximity to one another in streamer 516. The illustrated plurality of TFMs 520 include six TFMs, each having a different orientation: TFM 520-$a$ is oriented towards the left side of FIG. 7, TFM 520-$b$ is oriented towards the top side of FIG. 7, TFM 520-$c$ is oriented coming out of the page of FIG. 7, TFM 520-$e$ is oriented going into the page of FIG. 7, TFM 520-$f$ is oriented towards the bottom side of FIG. 7, and TFM 520-$g$ is oriented towards the right side of FIG. 7. The orientation of TFM 520-$d$ is not indicated, but any orientation will suffice. In some embodiments, the orientation of TFM 520-$d$ with respect to the other components is known. Note that pairs of TFMs 520 having opposite orientation are located axially symmetrically (i.e., 180° separated about axis 517 and the same distance therefrom). Orienting the TFMs 520 in different directions (e.g., orientations that differ by an angle of at least 45°) may be helpful in removing or reducing effects of magnetometer orientation in the data (e.g., blind spots), referred to herein as "directional effects". For example, the measurements from some or all of the plurality of TFMs 520 may be averaged to approximate a measurement proximate axis 517. The averaged approximated measurement may be less subject to directional effects than would be the direct measurement from TFM 520-d. As another example, measurements from the TFMs 520 may be filtered to remove directional effects. For example, a threshold may be determined, and measurements below the threshold may be assumed to be subject to blind spot influence, and thus given less or no weight. In some embodiments, the threshold may be preset, while in other embodiments the threshold may be selected based on collected data (e.g., preceding averages). In some embodiments, less than six TFMs, each having a different orientation, may be utilized. For example, two TFMs, having opposite orientation from one another, may be internally-mounted axially symmetrically. As another example, two pairs of TFMs may be internally-mounted axially symmetrically, wherein the TFMs of each pair have opposite orientation from one another, and the polar direction of one pair may be orthogonal to the polar direction of the other pair. Because TFMs may be treated as point sensors, the usage of N sensors in longitudinal proximity may reduce local noise with a factor of $N^{1/2}$. For example, 16 sensors may reduce the noise with a factor 4 to 0.125 pT. Furthermore, if deep large-scale structures are to be characterized, a longer integration time may be allowed, further reducing the noise. For instance, these noise levels can be sufficiently low in order to add the magnetic data measured from this TFM in the sub-surface inversion together with electric field data.

In some embodiments, a magnetometer data system may average data from some or all of the TFMs 520 to approximate a noise-reduced total magnetic field measurement. For example, a magnetometer data system may average data from TFM 520-a, TFM 520-b, TFM 520-c, TFM 520-e, TFM 520-f, and TFM 520-g to approximate a total magnetic field measurement proximate axis 517 of streamer 516. In some embodiments, a magnetometer data system may utilize data from some or all of the TFMs 520 to estimate a magnetic field gradient. For example, a magnetometer data system may utilize data from TFM 520-a, TFM 520-d, and TFM 520-g to estimate a magnetic field gradient proximate axis 517 of streamer 516.

FIG. 7 also illustrates additional streamer components of streamer 516, including two sets of power wires 544, two strength members 542, and two sets of signal wires 545. In some embodiments, the plurality of internally-mounted TFMs 520 and/or additional components may be separated, and/or held in their respective dispositions, by a filler material. In some embodiments, the streamer 516 may be manufactured with an extrusion process that places and retains the components in their respective dispositions within the streamer and/or any interstitial filler material. As illustrated, the plurality of TFMs 520 and the additional streamer components are disposed in streamer 516 axially symmetrically. For example, the two sets of power wires 544 are located on opposite sides of streamer 516, equally-distant from axis 517. The weight of the additional streamer components may then be distributed axially-symmetrically, thereby passively reducing motion noise.

In some embodiments, some or all of the plurality of TFMs 520 may be MFAMs. The small dimensions of the MFAMs may more easily achieve symmetrical weight distribution. For example, the weight of a MFAM located proximate the axis 517 of streamer 516 may be negligible in comparison to the weight of additional streamer components in longitudinal proximity therewith. Additionally, the small size of MFAMs may more easily achieve mounting TFMs 520 in longitudinal proximity to one another within streamer 516.

In some embodiments, the power and/or signals carried along each of the additional streamer components may be matched and/or balanced to counter-act EMI noise. In some embodiments, the plurality of TFM 520 may be symmetrically distributed about a point located away from axis 517. The streamer components, such as coaxial power lines 541, strength members 542, and coaxial signal lines 543, may be symmetrically disposed with respect to the point of symmetrical distribution of the plurality of TFMs, while being either symmetrically or unsymmetrically disposed with respect to axis 517. Such configuration may reduce EMI noise in data collected by the plurality of TFMs 520 in comparison to configurations wherein the streamer components are unsymmetrically disposed with respect to the plurality of TFMs 520.

In some embodiments, one or more externally-mounted TFMs (e.g., TFM 420 in FIG. 4) may be utilized in conjunction with a plurality of internally-mounted TFMs (e.g., TFMs 520 in FIG. 7). For example, externally-mounted TFMs 420 may be mounted in longitudinal proximity with the plurality of internally-mounted TFMs 520.

In some embodiments, one or more IMUs 530 (e.g., IMUs 530 in FIG. 5) may be mounted axially-symmetrically within streamer 516, and may be collocated with a plurality of TFMs 520 (e.g., TFMs 520 in FIG. 7).

In some embodiments, at other longitudinal locations along the streamer 516 (e.g., longitudinal locations other than illustrated in FIG. 7), a conductor cable (including one or more electrical wires and/or optical fibers) may be disposed proximate the axis 517. In embodiments wherein at least one internally-mounted TFM 520 is disposed proximate the axis 517 of the streamer 516 (e.g., TFM 520-d in FIG. 7), such TFM 520 may include pass-thru couplings for the conductor cable. In some embodiments, the conductor cable may conformally wrap around such TFM 520. In some embodiments, such TFM 520 may be disposed slightly off of axis 517 so that the conductor cable may follow near or along the axis 517.

In some embodiments, the plurality of TFMs 520 may be disposed in streamer 516 far away from the additional streamer components. For example, if the plurality of TFMs 520 are nearer to axis 517 than to the outer surface 518 of streamer 516, the additional streamer components may be disposed at or near the outer surface 518. In embodiments wherein streamer 516 has a jacket, the additional streamer components may be disposed immediately inside the jacket, immediately outside the jacket, or a combination thereof. By disposing the plurality of TFMs 520 far away from the additional streamer components, EMI noise may be reduced.

Figure 8:
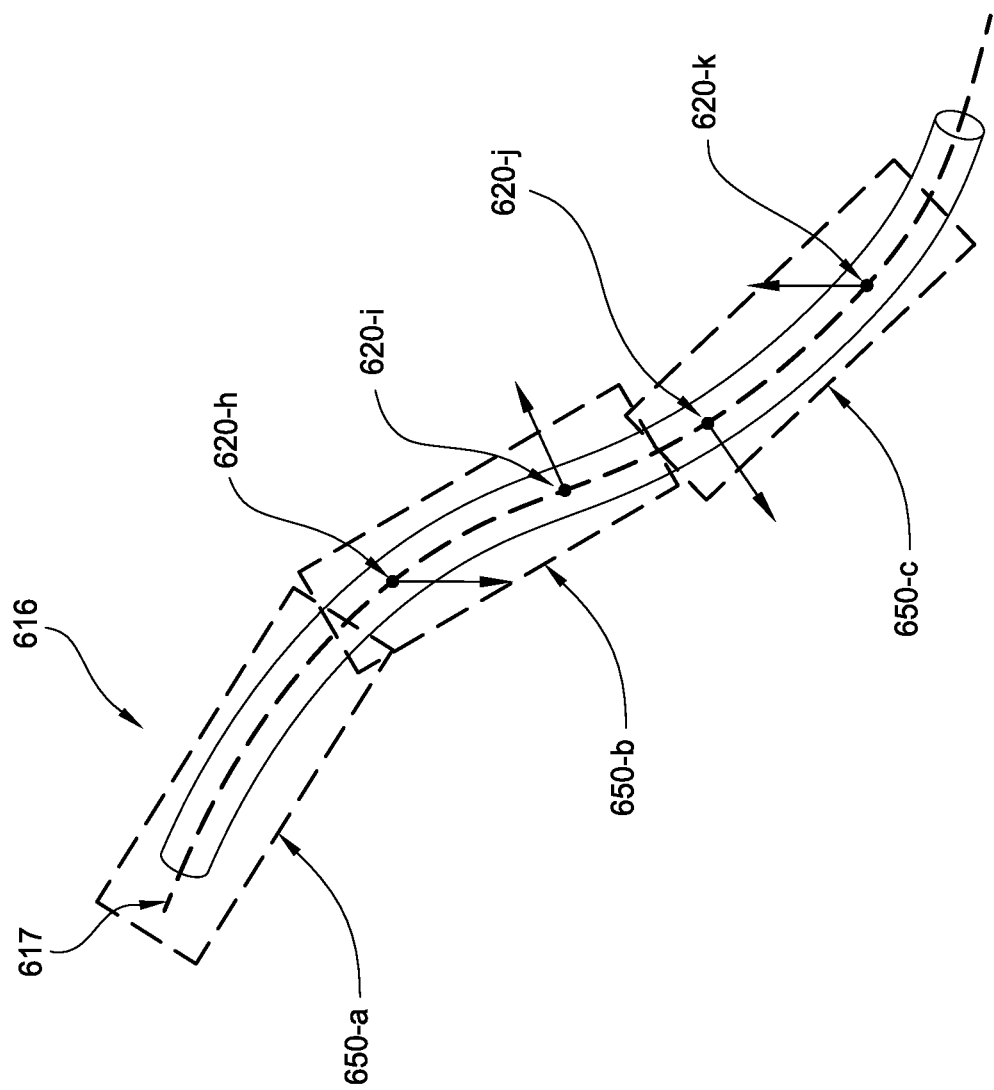
FIG. 8 illustrates another towing/mounting configuration for one or more total field magnetometers.

In some embodiments, groupings of TFMs longitudinally along a streamer length may cancel-out local streamer movement effects (i.e., motion noise) in the data. FIG. 8 illustrates streamer 616 having a plurality of internally-mounted TFMs 620-h, 620-i, 620-j, and 620-k, and identified streamer sections 650-a, 650-b, and 650-c. As illustrated, streamer sections 650 are of the same size dimensions, though embodiments may be envisioned having streamer sections 650 of different size dimensions. In some embodiments, each streamer section 650 may encompass a portion of the streamer 616 having a length between about 100 m and about 300 m. As illustrated, streamer sections 650 are not divided or separated by any particular hardware component, though embodiments may be envisioned wherein the streamer sections 650 correspond to separatelymanufactured or assembled streamer components. In some embodiments, neighboring streamer sections 650 may overlap, while in other embodiments, neighboring streamer sections 650 may be contiguously adjacent, while in still other embodiments, a distance along the length of the streamer may separate one streamer section 650 from its closest neighbor. As would be understood by one of ordinary skill in the art with the benefit of this disclosure, the identification of streamer sections 650 may be predetermined, programmatically determined, and/or determined on an ad hoc basis in response to survey conditions. For example, a magnetometer data system may identify each of the streamer sections 650 based on predetermined parameters, programmatic results, and/or data from some or all of the TFMs 620.

As illustrated, streamer section 650-a contains no TFMs 620, streamer section 650-b contains TFMs 620-h and 620-i (not in longitudinal proximity to one another), and streamer section 650-c contains TFMs 620-j and 620-k (not in longitudinal proximity to one another). In some embodiments, each streamer section 650 may contain the same number of TFMs 620, while in other embodiments the number of TFMs 620 varies from one streamer section 650 to another. As a streamer 616 is towed through a body of water (such as body of water 11 in FIG. 2), large scale currents or tides may shift much or all of the length of the streamer vertically, laterally, or a combination of the two. Similarly, small scale currents or waves may locally move a portion of the length of the streamer 616 vertically and/or laterally.

Noise in the data created by local noise may be attenuated by averaging data sets from magnetometers longitudinally distributed along portions of the streamer 616. For example, data from TFMs 620 longitudinally distributed along a particular streamer section 650 may be averaged to cancel-out noise from local motion in streamer 616. As illustrated in FIG. 8, data from TFM 620-h may be averaged with data from TFM 620-i to produce a data set corresponding to streamer section 650-b. Effects from motion that is local-to and smaller-than streamer section 650-b may be attenuated by averaging the data from TFM 620-h and TFM 620-i. For larger-scale local motion, data sets from multiple streamer sections 650 may be averaged. For example, effects from motion that is local-to and smaller-than the combination of streamer sections 650-b and 650-c may be attenuated by averaging the data from TFMs 620-h, 620-i, 620-j, and 620-k. As would be understood by one of ordinary skill in the art with the benefit of this disclosure, the identification of streamer sections 650, and thus the selection of TFMs 620 across-which data is to be averaged, may be predetermined, programmatically determined, and/or determined on an ad hoc basis in response to survey conditions. In some embodiments, a magnetometer data system may average data sets from magnetometers longitudinally distributed along portions of the streamer 616. In some embodiments, a magnetometer data system may identify each of the streamer sections 650 based on predetermined parameters, programmatic results, and/or data from some or all of the TFMs 620.

In some embodiments, one or more IMUs 530 (e.g., IMUs 530 in FIG. 5) may be mounted axially-symmetrically within streamer 616, and may be collocated with TFMs 620 (e.g., TFM 620 in FIG. 8). In some embodiments, measurements from IMU 530 may be used to estimate the motion and/or rotation experienced by a TFM 620 (e.g., during a survey), and the estimated motion and/or rotation may be used to estimate the motion and/or twist noise experienced by TFM 620. Data acquired by TFM 620 may then be adjusted to remove the estimated motion noise. Data from IMUs 530 may be utilized to identify streamer sections 650 and/or to select TFMs 620 across-which data is to be averaged.

In some embodiments, a TFM 620 in FIG. 8 represents a plurality of internally-mounted TFMs 520 (e.g., TFMs 520 in FIG. 7) in longitudinal proximity to one another in streamer 616. The measurements from each of the TFMs 520 may be averaged together to approximate a measurement of a TFM 620 proximate axis 617.

In some embodiments, a TFM 620 in FIG. 8 may represent one or more externally-mounted TFMs (e.g., TFM 420 in FIG. 4) instead of and/or in conjunction with a plurality of internally-mounted TFMs (e.g., TFMs 520 in FIG. 7). The measurements from each of the TFMs 420 and/or TFMs 520 in longitudinal proximity to one another in streamer 616 may be averaged together to approximate a measurement of a TFM 620 proximate axis 617.

In some embodiments, one or more externally-mounted TFMs (e.g., TFM 420 in FIG. 4) may be utilized instead of and/or in conjunction with internally-mounted TFMs (e.g., TFMs 620 in FIG. 8). For example, a streamer section 650 may include one or more externally-mounted TFMs 420 (not in longitudinal proximity to one another) in addition to, or in lieu of, internally-mounted TFMs 620. Effects from motion that is local-to and smaller-than the streamer section 650 may be attenuated by averaging the data from the TFMs 420 and/or TFMs 620 longitudinally distributed along streamer section 650.

In some embodiments, some or all of the TFMs 420, TFMs 520, and TFMs 620 on or in a streamer section 650 may be MFAMs. The small dimensions of MFAMs may mitigate the effects of drag force and/or leverage when the TFMs 420 are mounted at a distance from the axis 617 of the streamer 616. The small dimensions of the MFAMs may more easily achieve symmetrical weight distribution. For example, the weight of a MFAM located proximate the axis 617 of streamer 616 may be negligible in comparison to the weight of additional streamer components in longitudinal proximity therewith. Additionally, the small size of MFAMs may more easily achieve internally-mounting TFMs 520 in longitudinal proximity to one another within streamer 616.

FIG. 8 also illustrates TFMs 620 having different orientations: TFM 620-h is oriented towards the bottom side of FIG. 8, TFM 620-i is oriented towards the right side of FIG. 8, TFM 620-j is oriented towards the left side of FIG. 8, and TFM 620-k is oriented towards the top side of FIG. 8. Orienting the TFMs 620 in different directions may be helpful in removing or reducing noise from directional effects (e.g., blind spots). In some embodiments, streamer sections 650 are selected to include pairings of TFMs 620 having opposite orientations with one another. For example, noise from directional effects may be reduced by averaging across the combination of streamer sections 650-b and 650-c, thereby averaging the data from TFM 620-h with data from TFM 620-k, and averaging the data from 620-i with data from 620-j. In some embodiments, the orientation of a TFM 620 may be determined based on equipment installation conditions, such as the alignment of the poles of a magnetometer mounted on or in streamer 616. In embodiments wherein TFM 620 represents a plurality of internally-mounted TFMs 520 (e.g., TFMs 520 in FIG. 7) in longitudinal proximity to one another, the orientation of TFM 620 may be determined based on the orientations of each of the internally-mounted TFMs 520. As would be understood by one of ordinary skill in the art with the benefit of this disclosure, the orientation of TFM 620 may thus be selected by appropriately selecting a subset of TFMs 520 having different orientations and in longitudinal proximity to one another. For example, TFM 620-*h* (oriented downwardly) may be representative of a plurality of TFMs 520 as in FIG. 7, such as TFM 520-*a* (oriented leftwardly), TFM 520-*g* (oriented rightwardly), and TFM 520-*f* (oriented downwardly). The selection of TFMs 520 across-which data is to be averaged (to approximate a measurement for TFM 620) may be predetermined, programmatically determined, and/or determined on an ad hoc basis in response to survey conditions.

In accordance with a number of embodiments of the present disclosure, a geophysical data product may be produced. Geophysical survey data, such as data collected by magnetometers, seismic sensors, electromagnetic sensors, depth sensors, location sensors, etc., may be obtained (e.g., acquired during a survey and/or retrieved from a data library) and may be recorded on a non-transitory, tangible computer-readable medium. The geophysical data product may be produced by processing the survey data offshore (i.e. by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis, including further data processing, may be performed on the geophysical data product. In some instances, geophysical analysis may be performed on the geophysical data product offshore.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

In an embodiment, a streamer includes a total field magnetometer; and an inertial measurement unit collocated with the total field magnetometer.

In one or more embodiments disclosed herein, the total field magnetometer is proximate an axis of the streamer.

In one or more embodiments disclosed herein, the total field magnetometer is mounted internally to the streamer.

In one or more embodiments disclosed herein, the total field magnetometer is a micro-fabricated atomic magnetometer.

In one or more embodiments disclosed herein, the inertial measurement unit includes a three-axis vector magnetometer; a three-axis gyroscope; and a three-axis accelerometer.

In one or more embodiments disclosed herein, the streamer also includes a plurality of electromagnetic receivers.

In an embodiment, a streamer includes a first plurality of total field magnetometers, wherein the first plurality of total field magnetometers are: in longitudinal proximity with one another; and distributed symmetrically about an axis of the streamer.

In one or more embodiments disclosed herein, the streamer also includes additional streamer components distributed symmetrically about the axis of the streamer.

In one or more embodiments disclosed herein, at least one of the first plurality of total field magnetometers is proximate the axis of the streamer.

In one or more embodiments disclosed herein, at least one of the first plurality of total field magnetometers is mounted internally to the streamer.

In one or more embodiments disclosed herein, the streamer also includes a second plurality of total field magnetometers, wherein the second plurality of total field magnetometers are: in longitudinal proximity with one another; distributed symmetrically about the axis of the streamer; and longitudinally separated from the first plurality of total field magnetometers.

In one or more embodiments disclosed herein, a first one of the first plurality of total field magnetometers has a first orientation, a second one of the first plurality of total field magnetometers has a second orientation, and the first orientation differs from the second orientation by an angle of at least 45°.

In an embodiment, a streamer includes a plurality of total field magnetometers, wherein: a first subset of the plurality of total field magnetometers are contained within a first streamer section and are in longitudinal proximity with one another; a second subset of the plurality of total field magnetometers are contained within the first streamer section and are in longitudinal proximity with one another; and the first subset is not in longitudinal proximity with the second subset.

In one or more embodiments disclosed herein, a third subset of the plurality of total field magnetometers are contained within a second streamer section and are in longitudinal proximity with one another; a fourth subset of the plurality of total field magnetometers are contained within the second streamer section and are in longitudinal proximity with one another; and none of the first subset, second subset, third subset, and fourth subset are in longitudinal proximity with one another.

In one or more embodiments disclosed herein, at least one of the total field magnetometers is proximate an axis of the streamer.

In one or more embodiments disclosed herein, at least one of the total field magnetometers is mounted internally to the streamer.

In one or more embodiments disclosed herein, at least one of the total field magnetometers is a micro-fabricated atomic magnetometer.

In one or more embodiments disclosed herein, an inertial measurement unit is collocated with at least one of the total field magnetometers.

In one or more embodiments disclosed herein, the first subset of the plurality of total field magnetometers are distributed symmetrically about an axis of the streamer.

In one or more embodiments disclosed herein, the streamer also includes a magnetometer data system configured to at least one of: average data from the first subset of the plurality of total field magnetometers to approximate a total magnetic field measurement at a point in longitudinal proximity with the first subset; estimate a magnetic field gradient at the point; and identify the first streamer section and the second streamer section.

In one or more embodiments disclosed herein, the point is proximate an axis of the streamer.

In an embodiment, a method includes towing a streamer through a body of water, wherein the streamer comprises a first total field magnetometer and a second total field magnetometer; acquiring total magnetic field data with the first and the second total field magnetometers; and reducing noise in the total magnetic field data based on at least one of: averaging data from the first and the second total field magnetometers; filtering data from the first and the second total field magnetometers; estimating motion of the first total field magnetometer; and estimating rotation of the first total field magnetometer.

In one or more embodiments disclosed herein, the noise comprises at least one of: motion noise; twist noise; electromagnetic interference; and directional effects.

In one or more embodiments disclosed herein, an inertial measurement unit that is collocated with the first total field magnetometer is used to estimate the motion or the rotation.

In one or more embodiments disclosed herein, the reducing noise comprises: estimating motion of the first total field magnetometer based on the inertial measurement unit data; estimating motion-noise based on the estimated motion; and correcting the total magnetic field data based on the estimated motion-noise.

In one or more embodiments disclosed herein, the method also includes acquiring data with a first plurality of total field magnetometers, wherein the first plurality of total field magnetometers are: in longitudinal proximity with one another; and distributed symmetrically about an axis of the streamer; and at least one of: averaging data from the first plurality of total field magnetometers to approximate a total magnetic field measurement at a point in longitudinal proximity with the plurality; and filtering data from the first plurality of total field magnetometers to remove directional effects; and estimating a magnetic field gradient at the point.

In one or more embodiments disclosed herein, the method also includes acquiring data with a plurality of total field magnetometers, wherein: a first subset of the plurality of total field magnetometers are contained within a first streamer section and are in longitudinal proximity with one another; a second subset of the plurality of total field magnetometers are contained within the first streamer section and are in longitudinal proximity with one another; and the first subset is not in longitudinal proximity with the second subset; averaging data from the first subset with data from the second subset; and attenuating effects in the total magnetic field data from motion that is local to the first streamer section based on the averaging.

In one or more embodiments disclosed herein, the method also includes acquiring survey data with electromagnetic sensors on the streamer; and reducing noise in the survey data based on the total magnetic field data.

In one or more embodiments disclosed herein, the method also includes jointly inverting the survey data and the total magnetic field data.

In one or more embodiments disclosed herein, the method also includes processing the survey data to produce a geophysical data product.

In one or more embodiments disclosed herein, the method also includes recording the geophysical data product on a non-transitory, tangible computer-readable medium suitable for importing onshore.

In one or more embodiments disclosed herein, the method also includes performing geophysical analysis onshore on the geophysical data product.

While the foregoing is directed to embodiments of the present disclosure, other and further embodiments of the disclosure may be devised without departing from the basic scope thereof, and the scope thereof is determined by the claims that follow.

The invention claimed is:

1. A method comprising:
towing a streamer through a body of water, wherein the streamer comprises a first total field magnetometer and a second total field magnetometer;
acquiring total magnetic field data with the first and the second total field magnetometers;
reducing noise in the total magnetic field data based on at least one of:
averaging data from the first and the second total field magnetometers;
filtering data from the first and the second total field magnetometers;
estimating motion of the first total field magnetometer; and
estimating rotation of the first total field magnetometer;
acquiring data with a plurality of total field magnetometers, wherein the plurality of total field magnetometers are:
in longitudinal proximity with one another; and
distributed symmetrically about an axis of the streamer; and
at least one of:
averaging data from the plurality of total field magnetometers to approximate a total magnetic field measurement at a point in longitudinal proximity with the plurality of total field magnetometers;
filtering data from the plurality of total field magnetometers to remove directional effects; and
estimating a magnetic field gradient at the point.

2. The method of claim 1, wherein the noise comprises at least one of:
motion noise;
twist noise;
electromagnetic interference; and
directional effects.

3. The method of claim 1, wherein an inertial measurement unit that is collocated with the first total field magnetometer is used to estimate the motion or the rotation.

4. The method of claim 3, wherein the reducing noise comprises:
estimating motion of the first total field magnetometer based on the inertial measurement unit data;
estimating motion-noise based on the estimated motion; and
correcting the total magnetic field data based on the estimated motion-noise.

5. The method of claim 1, further comprising:
acquiring survey data with electromagnetic sensors on the streamer; and
reducing noise in the survey data based on the total magnetic field data.

6. The method of claim 5, further comprising jointly inverting the survey data and the total magnetic field data to produce a geophysical data product.

7. A method comprising:
towing a streamer through a body of water, wherein the streamer comprises a first total field magnetometer and a second total field magnetometer;
acquiring total magnetic field data with the first and the second total field magnetometers;
reducing noise in the total magnetic field data based on at least one of:
averaging data from the first and the second total field magnetometers;
filtering data from the first and the second total field magnetometers;
estimating motion of the first total field magnetometer; and
estimating rotation of the first total field magnetometer;
acquiring data with a plurality of total field magnetometers, wherein:

a first subset of the plurality of total field magnetometers are contained within a first streamer section and are in longitudinal proximity with one another;

a second subset of the plurality of total field magnetometers are contained within the first streamer section and are in longitudinal proximity with one another; and the first subset is not in longitudinal proximity with the second subset;

averaging data from the first subset with data from the second subset; and attenuating effects in the total magnetic field data from motion that is local to the first streamer section based on the averaging.

8. The method of claim 7, wherein the noise comprises at least one of:
motion noise;
twist noise;
electromagnetic interference; and
directional effects.

9. The method of claim 7, wherein an inertial measurement unit that is collocated with the first total field magnetometer is used to estimate the motion or the rotation.

10. The method of claim 9, wherein the reducing noise comprises:
estimating motion of the first total field magnetometer based on the inertial measurement unit data;
estimating motion-noise based on the estimated motion; and
correcting the total magnetic field data based on the estimated motion-noise.

11. The method of claim 7, further comprising:
acquiring survey data with electromagnetic sensors on the streamer; and
reducing noise in the survey data based on the total magnetic field data.

12. The method of claim 11, further comprising jointly inverting the survey data and the total magnetic field data to produce a geophysical data product.

* * * * *